(12) United States Patent
Bhagat et al.

(10) Patent No.: US 8,086,964 B2
(45) Date of Patent: Dec. 27, 2011

(54) METHOD AND SYSTEM FOR DISCOVERING AND ACTING ON TAGGED INFORMATION IN SOFTWARE ARTIFACTS

(75) Inventors: Ishfak F. Bhagat, Pune Maharashtra (IN); Adnan S. Jariwala, Pune Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 11/770,881

(22) Filed: Jun. 29, 2007

(65) Prior Publication Data

US 2009/0006984 A1    Jan. 1, 2009

(51) Int. Cl.
*G06F 3/00* (2006.01)

(52) U.S. Cl. .......... 715/760; 715/752; 715/753

(58) Field of Classification Search ........... 715/760, 715/752, 753; 709/206, 207, 217, 224
See application file for complete search history.

(56) References Cited

U.S. PATENT DOCUMENTS

| | | | |
|---|---|---|---|
| 6,981,212 B1 | 12/2005 | Claussen et al. | |
| 7,155,482 B2 * | 12/2006 | Shinohara et al. | 709/206 |
| 7,191,397 B2 * | 3/2007 | Brooke et al. | 715/239 |
| 7,567,542 B2 * | 7/2009 | Rybak et al. | 370/338 |
| 7,584,251 B2 * | 9/2009 | Brown et al. | 709/206 |
| 2004/0111478 A1 * | 6/2004 | Gross et al. | 709/206 |
| 2005/0108649 A1 | 5/2005 | Ueda | |
| 2005/0120108 A1 * | 6/2005 | Wisniewski et al. | 709/224 |
| 2006/0036590 A1 * | 2/2006 | Kouchri et al. | 707/3 |
| 2010/0268793 A1 * | 10/2010 | Wolff et al. | 709/217 |

OTHER PUBLICATIONS

"XML and Building Automation", Alex Chervet, ASHREE Journal, Dec. 2004, pp. 24-32.

\* cited by examiner

*Primary Examiner* — Ba Huynh

(74) *Attorney, Agent, or Firm* — Cantor Colburn LLP; Raymond Szeto

(57) ABSTRACT

According to exemplary embodiments, a method and system are provided for discovering and acting on action tags within an artifact. Upon a determination that an artifact is attached to a document in a host application, an action tag processor is invoked. The action tag processor analyzes the artifact to discover action tags and properties associated with the action tags present in the artifact. Host application APIs are invoked to perform actions on the tags. The host applications processes the action tags according to a context of an application running on the host application.

3 Claims, 2 Drawing Sheets

METHOD AND SYSTEM FOR DISCOVERING AND ACTING ON TAGGED INFORMATION IN SOFTWARE ARTIFACTS

BACKGROUND

The present invention relates generally to artifact processing and, more particularly, to processing of action tags within software artifacts.

Interactive software tools, such as documents editors and email clients, allow a user to attach external objects (files) into a document being edited. These objects are typically the output from other software applications.

For example, a file containing an eXtensible Markup Language (XML) Form may be embedded into a Lotus Notes mail message. For the purpose of this discussion, the external file or attachment may be called an "artifact", and the application into which it is being attached may be called the "host application". In the example above, the XML form is the artifact, while the Lotus Notes client is the host application.

In many cases, the artifact contains information that is relevant to the host application. For example, an XML form being attached to a notes message may contain information, such as subject matter, person names, etc. Such information may be meaningful to the message being created and may help the messaging system in formulating the message. In other words, the content of the artifact might be useful to the host application.

Currently, artifacts are typically treated as binary streams by the host application. The host application does not attempt to decipher the content of the artifact but treats it like a "black box", relying on viewers and third party applications to process and render the artifact when required. There is no method currently available for the host application to leverage the information contained in artifacts.

SUMMARY

According to exemplary embodiments, a method and system are provided for discovering and acting on action tags within an artifact, such as an XML document. Upon a determination that an artifact is attached to a document in a host application, an action tag processor is invoked. The action tag processor analyzes the artifact to discover action tags and properties associated with the action tags present in the artifact. Host application APIs are invoked to perform actions on the tags. The host application processes the action tags according to a context of an application running on the host application.

BRIEF DESCRIPTION OF THE DRAWINGS

Referring to the exemplary drawings, wherein like elements are numbered alike in the several Figures.

DETAILED DESCRIPTION

According to an exemplary embodiment, artifact content may be leveraged, and relevant information in the artifact may be acted upon to significantly enhance the usability of software applications.

According to an exemplary embodiment, a method and a system are provided that describe "action tags" in an artifact, such as an XML form, and act upon such tags in the context of the host application. The context is determined by the host application. For example, the context of a mail client application includes the mail message, subject, to, and cc lists. The context of a directory application includes the member name, attributes, and so on. According to exemplary embodiments, the host application is able to leverage the information contained in the artifact and act on that information within its context.

The action tags contained in the artifact are special tags that point to information within the artifact. The action tags also include a set of actions that can be taken on that information. The action tag processor has the capability to look for action tags in a given markup language form, e.g., an XML form, and prepare a list of such tags and associated values. The action tag processor invokes applicable host application programming interfaces (APIs) to act upon relevant action tags.

According to an exemplary embodiment, when an XML form is attached to a document in the host application, the host application invokes the action tag processor. The action tag processor acts upon the XML form to discover a list of action tags and their properties present in the form. The action tag processor then invokes host application APIs to perform actions on the tags. This allows the host application to act upon relevant information in embedded files.

Figure 1:
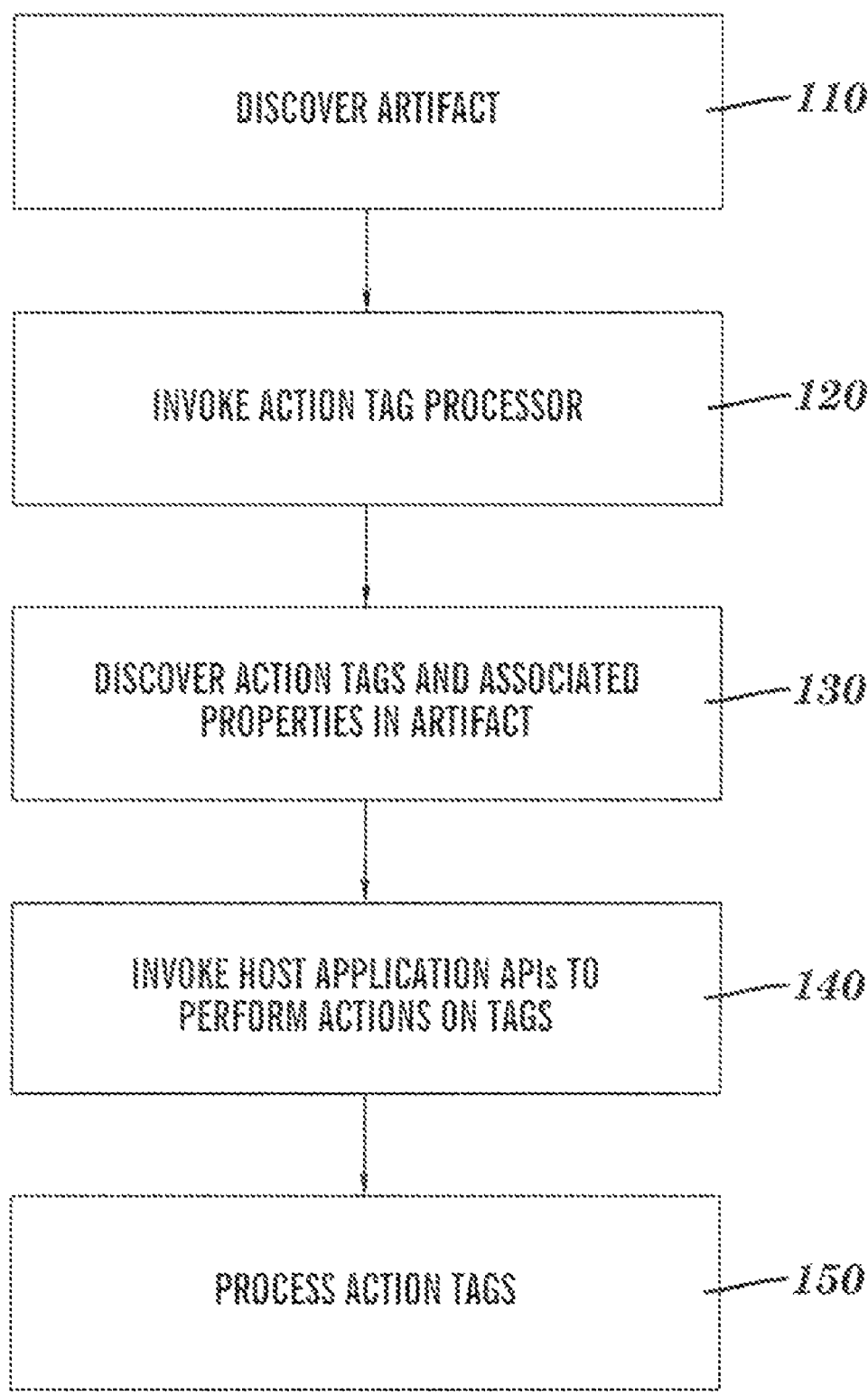
FIG. 1 illustrates a method for discovering and acting on tagged information in an artifact according to a exemplary embodiment.

FIG. 1 illustrates an exemplary method for discovering and acting on tags according to an exemplary embodiment. The method starts at step 110 at which an artifact, such a XML form, attached to a document in a host application is discovered. At step 120, an action tag processor is invoked. At step 130, the action tag processor analyzes the artifact to discover action tags and properties associated with the action tags present in the artifact. At step 140, host application APIs are invoked to perform actions on the tags. The host application processes the action tags at step 150 according to a context of an application running on the host application.

As an illustrative example, consider an Activity Explorer host application (such as that available in IBM Workplace Release 2.6). Activity Explorer is an interactive software application that allows users to create activity threads with artifacts such as documents, images, instant-messages, emails. According to an exemplary embodiment, related artifacts may be tracked in Activity Explorer in the context of a single activity. Applying the action tag concept to Activity Explorer allows the Activity Explorer application to act upon meaningful information available in the artifact.

As an example, consider a user who records minutes of a meeting (MOM) in an XML form using, e.g., a preexisting template with defined action tags. The action tags in the form identity names of participants in the meeting being recorded {could there also be action items identifying other individuals that might not be participants in the meeting?} and MOM action items including, for example, the individuals to whom these action items are assigned and the complete-by-dates. This information may potentially be put into an electronic mail message. A user creates an activity object with the XML form (artifact). Activity Explorer invokes the action tag processor to process the input XML form. The action tag processor discovers action tags containing member names and MOM action items from the XML form. The action tag processor invokes Activity Explorer APIs to add activity members using the member names identified from the action tags. The processor invokes an Activity Explorer API to send email messages using the MOM action items identified from the action tags.

Figure 2:
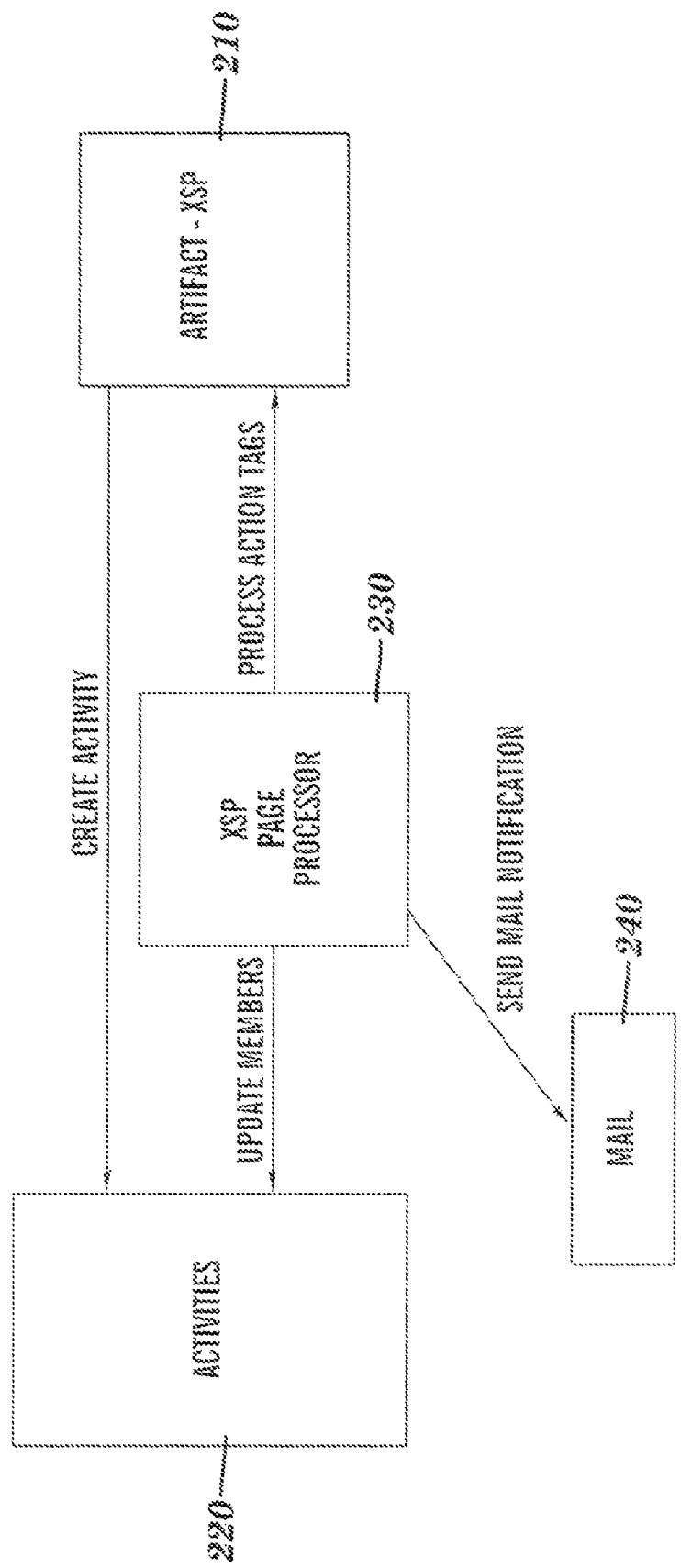
FIG. 2 illustrates a system for discovering and acting on tagged information in an artifact according to an exemplary embodiment.

FIG. 2 illustrates a system for discovering and acting on tags according to an exemplary embodiment. In the example illustrated, the artifacts is an Extensible Server Page (XSP) 210, a file on a web server that produces structured XML output. An activity is created using, e.g., an activity application 220, based on the XSP 210. The XSP page processor 230 processes action tags in the XSP 210. In the example shown in FIG. 2, the XSP 210 may include minutes of a meeting and action tags containing member names and MOM action items. The XSP page processor 230 processes the action tags and adds member names to the activity application 220 using the member names identified from the action tags. The XSP page processor 230 also causes email messages to be sent by an email server 240 based on the MOM action items identified from the action tags. Although not shown for simplicity of illustration, the XSP 210, XSP page processor 230, and activity application 220 may be included in a host application {is this correct?? Is the XSP page processor an action tag processor? Is the action tag processor typically included in the host application?}.

While exemplary embodiments have been described above, it will be understood by those skilled in the art that various changes may be made and equivalents may be substituted for elements thereof without departing from the scope of the invention. For example, although the description above is directed to an XML form artifact used in an Activity Explorer environment, it should be appreciated that the invention is applicable to any type of software artifact including tags that are discoverable and that may be acted upon. In addition, many modifications may be made to adapt a particular situation or material to the teachings of the invention without departing from the essential scope thereof. Therefore, it is intended that the invention not to be limited to the particular embodiment disclosed as the best mode contemplated for carrying out this invention, but that the invention will include all embodiments falling within the scope of the appended claims.

What is claimed is:

1. A method for discovering and acting on tagged information in an artifact, comprising:
    determining when an artifact including minutes of a meeting, action tags identifying names of participants in the meeting and assigned action items is attached to a document in a mail application;
    invoking an action tag processor by the host application when the artifact is attached to the document; and
    using the action tag processor to analyze the artifact to discover the action tags and properties associated with the action tags present therein, to generate a list of the action tags and the associated properties, to identify the participant names and the action items based on the action tags, to invoke a host application programming interface (API) to process the action tags according to a context of an application running on the host application and to add activity members based on the participant names, and to cause an email server to send email messages to the participant names based on the action items identified from the action tags.

2. The method of claim 1, wherein the artifact is an extensible markup language (XML) form.

3. The method of claim 1, wherein the action tags include a set of actions that can be taken.

* * * * *